US011353588B2

United States Patent
Onal et al.

(10) Patent No.: US 11,353,588 B2
(45) Date of Patent: Jun. 7, 2022

(54) TIME-OF-FLIGHT SENSOR WITH STRUCTURED LIGHT ILLUMINATOR

(71) Applicant: Waymo LLC, Mountain View, CA (US)

(72) Inventors: Caner Onal, Palo Alto, CA (US); David Schleuning, Piedmont, CA (US); Brendan Hermalyn, San Francisco, CA (US); Simon Verghese, Mountain View, CA (US); Alex Mccauley, Sunnyvale, CA (US); Brandyn White, Mountain View, CA (US); Ury Zhilinsky, Sunnyvale, CA (US)

(73) Assignee: Waymo LLC, Mountain View, CA (US)

(*) Notice: Subject to any disclaimer, the term of this patent is extended or adjusted under 35 U.S.C. 154(b) by 783 days.

(21) Appl. No.: 16/177,626

(22) Filed: Nov. 1, 2018

(65) Prior Publication Data

US 2020/0142069 A1    May 7, 2020

(51) Int. Cl.
*G01S 17/89* (2020.01)
*G06T 7/521* (2017.01)
(Continued)

(52) U.S. Cl.
CPC ............ *G01S 17/89* (2013.01); *G01S 7/4808* (2013.01); *G01S 7/4817* (2013.01);
(Continued)

(58) Field of Classification Search
CPC ...... G01S 17/89; G01S 17/931; G01S 7/4808; G01S 7/4817; G01S 7/4865; G01S 7/497; G01S 17/08; G01S 17/48; G06T 7/521
See application file for complete search history.

(56) References Cited

U.S. PATENT DOCUMENTS 9,760,837 B1    9/2017 Nowozin et al.
9,823,352 B2    11/2017 Meinherz et al.
(Continued)

FOREIGN PATENT DOCUMENTS

EP         3223188 A1 *  9/2017  ......... G06K 9/00791
KR   10-2018-0110051        10/2018

OTHER PUBLICATIONS

International Searching Authority, International Search Report and Written Opinion dated Feb. 11, 2020, issued in connection with International Patent Application No. PCT/US2019/057300, filed on Oct. 21, 2019, 10 pages.

*Primary Examiner* — Luke D Ratcliffe
(74) *Attorney, Agent, or Firm* — McDonnell Boehnen Hulbert & Berghoff LLP

(57) ABSTRACT

The present disclosure relates to systems and methods that provide information about a scene based on a time-of-flight (ToF) sensor and a structured light pattern. In an example embodiment, a sensor system could include at least one ToF sensor configured to receive light from a scene. The sensor system could also include at least one light source configured to emit a structured light pattern and a controller that carries out operations. The operations include causing the at least one light source to illuminate at least a portion of the scene with the structured light pattern and causing the at least one ToF sensor to provide information indicative of a depth map of the scene based on the structured light pattern.

26 Claims, 13 Drawing Sheets

(51) Int. Cl.
   *G01S 7/497*   (2006.01)
   *G01S 7/481*   (2006.01)
   *G01S 7/48*    (2006.01)
   *G01S 7/4865*  (2020.01)
   *G01S 17/08*   (2006.01)
   *G01S 17/931*  (2020.01)

(52) U.S. Cl.
   CPC ............ *G01S 7/4865* (2013.01); *G01S 7/497* (2013.01); *G01S 17/08* (2013.01); *G01S 17/931* (2020.01); *G06T 7/521* (2017.01)

(56) References Cited

U.S. PATENT DOCUMENTS

| | | | |
|---|---|---|---|
| 10,816,939 B1* | 10/2020 | Coleman | G01S 17/86 |
| 2014/0168424 A1 | 6/2014 | Attar et al. | |
| 2015/0042765 A1* | 2/2015 | Pfister | B60R 1/002 |
| | | | 348/48 |
| 2015/0062558 A1 | 3/2015 | Koppal et al. | |
| 2016/0209729 A1 | 7/2016 | Hudman | |
| 2016/0349043 A1 | 12/2016 | Lee et al. | |
| 2017/0068319 A1 | 3/2017 | Viswanathan | |
| 2017/0123067 A1 | 5/2017 | Van der Tempel | |
| 2018/0267151 A1 | 9/2018 | Hall et al. | |
| 2018/0275278 A1* | 9/2018 | Yamada | G01S 17/08 |
| 2019/0339364 A1* | 11/2019 | Nash | G01S 17/894 |

\* cited by examiner

Top View

Top View

TIME-OF-FLIGHT SENSOR WITH STRUCTURED LIGHT ILLUMINATOR

BACKGROUND

Time-of-Flight (ToF) sensors typically provide low-resolution depth information about a scene, but can be subject to stray light "blooming" and/or provide inaccurate depth information when imaging highly reflective or highly absorbing materials.

Structured light can include light emitted according to a desired or predetermined illumination pattern and/or illumination schedule. Some light sources may be configured to illuminate a scene with structured light.

SUMMARY

The present disclosure beneficially combines aspects of ToF sensors and structured light to provide more accurate, higher-resolution depth information.

In a first aspect, a sensor system is provided. The sensor system includes at least one time-of-flight (ToF) sensor configured to receive light from a scene. The sensor system also includes at least one light source configured to emit a structured light pattern. Furthermore, the sensor system includes a controller that carries out operations. The operations include causing the at least one light source to illuminate at least a portion of the scene with the structured light pattern. The operations also include causing the at least one ToF sensor to provide information indicative of a depth map of the scene based on the structured light pattern.

In a second aspect, a system is provided. The system includes a plurality of sensor systems configured to be coupled to a vehicle. Each sensor system includes at least one time-of-flight (ToF) sensor and at least one imaging sensor. The at least one ToF sensor and the at least one imaging sensor are configured to receive light from a scene. Each sensor system also includes at least one light source configured to emit a structured light pattern and a controller that carries out operations. The operations include causing the at least one light source to illuminate at least a portion of the scene with the structured light pattern. The operations also include causing the at least one ToF sensor to provide information indicative of a depth map of the scene based on the structured light pattern. The operations additionally include causing the imaging sensor to provide information indicative of an image of the scene based on the structured light pattern.

In a third aspect, a method is provided. The method includes causing at least one light source to illuminate a scene with a structured light pattern. The method additionally includes receiving, from a time-of-flight (ToF) sensor, information about the scene based on the structured light pattern. The method also includes determining a depth map of the scene based on the received information. The method yet further includes determining at least one inference about the scene based on the depth map of the scene.

In a fourth aspect, a method is provided. The method includes providing prior information. The prior information includes three-dimensional information of a scene. The method includes causing at least one light source to illuminate the scene with a structured light pattern. The method also includes causing the at least one ToF sensor to provide time of flight information indicative of a depth map of the scene based on the structured light pattern.

Other aspects, embodiments, and implementations will become apparent to those of ordinary skill in the art by reading the following detailed description, with reference where appropriate to the accompanying drawings.

DETAILED DESCRIPTION

Figure 1:
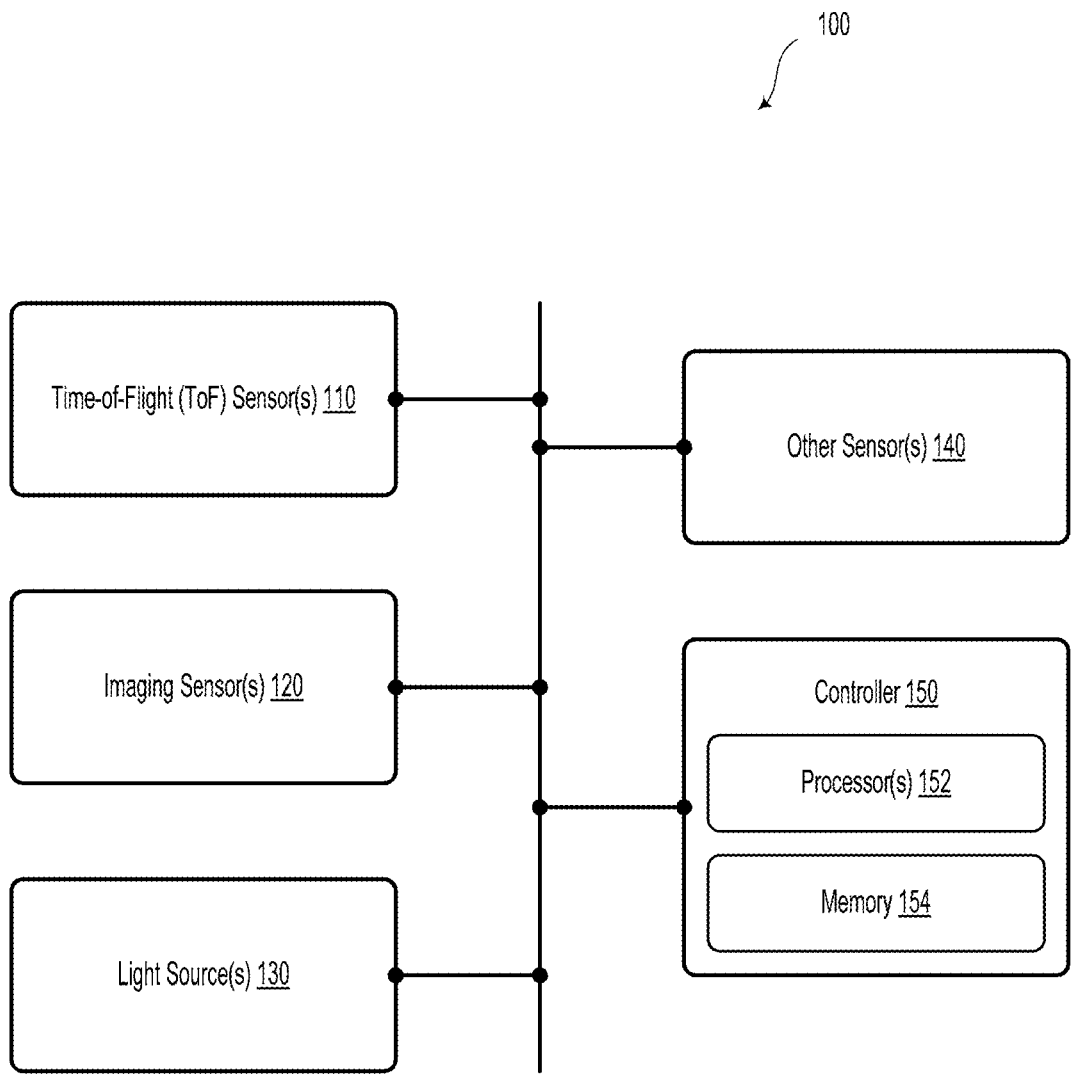
FIG. 1 illustrates a system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

Imaging sensors typically provide high quality, high-resolution, two-dimensional images of a scene, but do not typically provide independent depth information. Time-of-Flight (ToF) sensors typically provide low-resolution depth information about a scene, but can be subject to artifacts such as image blooming in the presence of highly reflective objects or inaccurate depth measurements in the presence of mixed scenes with reflective and absorptive objects. The present disclosure beneficially combines the desirable aspects of both types of sensors to provide more accurate, higher-resolution depth information.

In some examples, blooming can occur when a given sensor pixel absorbs enough photons such that the number of photo-generated charge carriers exceeds a full well capacity (FWC). In such scenarios, upon reaching FWC, excess charge carriers can "overflow" into neighboring sensor pixels, producing a smearing or blurring effect, which may reduce image quality and/or reduce confidence in depth information.

A hybrid imaging system could include: 1) at least one ToF sensor; 2) an optional imaging sensor; 3) at least one light source for illuminating the scene with structured light using continuous wave (CW), pulsed, or aperiodic illumination; and 4) a controller, which may include a computer, a processor, and/or a Deep Neural Net. The ToF sensor and the imaging sensor may be spatially registered to one another and may utilize overlapping portions of the same optical path. For example, the ToF sensor and the imaging sensor could be spatially registered to one another such that they have a similar (e.g., roughly identical) field of view and their relative position and orientation could be known and/or fixed with respect to one other.

Each sensor unit of a plurality of sensor units of such a hybrid imaging system could be mounted on each side (or corner) of a vehicle. Respective sensor units could also be mounted in one or more spinning platforms at various locations on the vehicle. In an example embodiment, each sensor unit may include a 180 degree field of view of a scene around the vehicle. In some embodiments, sensor units could be positioned on the vehicle so as to have partially overlapping fields of view of the environment around the vehicle.

In an example embodiment, to avoid blooming or other depth information artifacts, a plurality of ToF sensors could be associated with one or more image sensors in a given sensor unit. The respective ToF sensors could be spread out (e.g., spaced apart by 10 cm or more) so as to reduce the effects of blooming from specular reflections and other bright light sources. In some embodiments, the ToF sensors could be operated between 10-100 MHz, however other operating frequencies are contemplated and possible. In some embodiments, the operating frequency of the respective ToF sensor may be adjusted based on a desired maximum depth sensing range. For instance, a ToF sensor could be operated at 20 MHz for a desired depth sensing range (e.g., unambiguous range) of approximately 7.5 meters. In some embodiments, the ToF sensor could have a maximum desired depth sensing range of 100 meters or more.

In some embodiments, the ToF sensor could include CMOS or CCD photo-sensitive elements (e.g., silicon PIN diodes). However, other types of ToF sensors and ToF sensor elements are contemplated. In some cases, the ToF sensor could be operated using various phase shift modes (e.g., a 2× or 4× phase shift).

In some embodiments, the imaging sensor could include an RGB imaging sensor, such as a megapixel-type camera sensor. The imaging sensor could include a plurality of CMOS or CCD photo-sensitive elements.

In some examples, one or more light sources could be used to illuminate the scene (or respective portions of the scene). In such scenarios, the light sources could be modulated to provide a predetermined light pulse (or series of light pulses) that could be used in conjunction with the ToF sensor to provide depth information. Additionally or alternatively, the series of light pulses (e.g., a pulse repetition rate, a pulse duration, and/or a duty cycle) could be selected so as to provide a desired exposure for the imaging sensor.

The one or more light sources could include a light strip that is disposed along a portion of the vehicle. Additionally or alternatively, the one or more light sources could include a grid of light panels, each segment of which could individually provide different light pulses. Yet further, the one or more light sources could provide one or more light beams that can be moved in a point-wise and/or scanning fashion.

The one or more light sources could be operated in CW and/or in pulsed (e.g., sine wave, sawtooth, or square wave) operation mode. Without limitation, the one or more light sources could include at least one of: a laser diode, a light-emitting diode, a plasma light source, a strobe, a solid-state laser, a fiber laser, or another type of light source. The one or more light sources could be configured to emit light in the infrared wavelength range (e.g., 850, 905, 940, and/or 1550 nanometers). In some embodiments, multiple illumination light wavelengths could be used to disambiguate between multiple light sources, etc. Additionally or alternatively, the illumination wavelength may be adjusted based on an amount of ambient light in the environment and/or a time of day.

In another example embodiment, the one or more light sources could emit a structured light pattern into the environment. The structured light pattern could provide improved registration and/or resistance to blooming effects. As an example, the structured light pattern could be formed by transmitting light through a diffractive optic element. In another embodiment, a laser light pattern (e.g., random laser speckle or predetermined laser light pattern) could be used to provide the structured light pattern. In yet further embodiments, a deformable or adjustable reflective, diffractive, or refractive surface (e.g., a micromirror array) could be used to provide the structured light pattern and/or to shift the pattern with respect to the scene.

Additionally or alternatively, the one or more light sources could be configured to emit one or more classes of structured light patterns. For instance, the classes of structured light patterns could include one or more spatial classes, where some regions of a field of view are illuminated (or not illuminated) according to a predetermined spatial light pattern. Other classes of structured light patterns could include temporal classes, where various regions of a field of view are illuminated at different times according to a predetermined temporal illumination schedule. Yet other classes of structured light could include spectral classes, where various regions of a field of view are illuminated with different wavelengths—or wavebands—of light according to a predetermined spectral illumination pattern. However, other ways to form a structured light pattern are possible and contemplated herein.

In some embodiments, the structured light pattern could be used to disambiguate spatial locations within a scene. For example, the structured light pattern could include circular and/or oval-shaped light "spots". Each spot could have a different shape or orientation (e.g., rotation, spatial extent, radius of curvature, elongation, etc.) based on, for example, an emission angle of light through the diffractive optic element or a spatial position in the scene with respect to the light source. In some embodiments, a predetermined astigmatism of the optical element could be utilized to disambiguate between light spots in the structured light pattern.

The controller could be operable to combine outputs of the respective sensors (e.g., using sensor fusion) and/or make inferences about the three-dimensional scene around the vehicle. For example, the controller could make inferences to provide a grayscale or color-intensity map of the vehicle's surroundings. The inferences may additionally or alternatively provide information about objects in the vehicle's environment. In an example embodiment, the object information could be provided at a refresh rate of 60 or 120 Hz. However, other refresh rates are possible and contemplated.

In an example embodiment, the system could include one or more deep neural networks. The deep neural networks(s) could be utilized to provide the inferences based on training data and/or an operating context of the vehicle. In some cases, the low-resolution depth information and the image information may be provided to the deep neural network. Subsequently, the deep neural network could make inferences based on the received information and/or provide output depth maps (e.g., point clouds) at a high-resolution.

In some embodiments, two or more of: the ToF sensor, the image sensor, the light source, and the controller could be coupled to the same substrate. That is, the system could include a monolithic chip or substrate so as to provide a smaller sensor package and/or provide other performance improvements.

II. Example Systems

FIG. 1 illustrates a system 100, according to an example embodiment. The system 100 includes at least one Time-of-Flight (ToF) sensor 110, or ToF camera. In an example embodiment, the at least one ToF sensor 110 could include a plurality of complementary metal-oxide semiconductor (CMOS) or charge-coupled device (CCD) photosensitive elements (e.g., silicon PIN diodes). Other types of photosensitive elements could be utilized by the ToF sensor 110.

In some embodiments, the at least one ToF sensor 110 could be configured to actively estimate distances to environmental features in its respective field of view based on the speed of light. For instance, the ToF sensor 110 could measure the time-of-flight of a light signal (e.g., a light pulse) upon traveling between a light source (e.g., light source 130) and an object in the scene. Based on estimating the time-of-flight of light pulses from a plurality of locations within a scene, a range image or depth map can be built up based on the ToF sensor's field of view. While the distance resolution can be 1 centimeter or less, the lateral resolution can be low as compared to standard 2D imaging cameras.

In some embodiments, the ToF sensor 110 can obtain images at 120 Hz or faster. Without limitation, the ToF sensor 110 could include a range-gated imager or a direct time-of-flight imager.

Optionally, the system 100 may also include at least one imaging sensor 120. In an example embodiment, the imaging sensor 120 could include a plurality of photosensitive elements. In such a scenario, the plurality of photosensitive elements could include at least one million photosensitive elements. The at least one ToF sensor 110 and the at least one imaging sensor 120 are configured to receive light from a scene.

The system 100 also includes at least one light source 130. In an example embodiment, the at least one light source 130 could include at least one of: a laser diode, a light-emitting diode, a plasma light source, a strobe light, a solid-state laser, or a fiber laser. Other types of light sources are possible and contemplated in the present disclosure. The at least one light source 130 could include a light strip (e.g., disposed along a portion of a vehicle). Additionally or alternatively, the at least one light source 130 could include, for example, a grid of light panels, each segment of which could individually provide different light pulses. Yet further, the at least one light source 130 could provide one or more light beams that can be moved in a point-wise and/or scanning fashion. The at least one light source 130 could be operated in a continuous wave (CW) mode and/or in a pulsed (e.g., sine wave, sawtooth, or square wave) operation mode.

In an example embodiment, the at least one light source 130 could be configured to emit infrared light (e.g., 900-1600 nanometers). However, other wavelengths of light are possible and contemplated.

In some embodiments, the at least one light source 130 could be configured to emit light into the environment according to a desired structured light pattern. The structured light pattern could include, for example, aperiodic and/or inhomogeneous illumination of the environment by the at least one light source 130. For example, the desired structured light pattern could include a checkerboard pattern, a dot pattern, a stripe pattern, a speckle pattern, or another predetermined light pattern. Additionally or alternatively, in some embodiments, pseudorandom light patterns are possible and contemplated. The desired structured light pattern could be defined by light pulses, or shots, emitted along a predetermined pointing angle and/or within a predetermined field of view. In some embodiments, the light pulses could be provided at different temporal and/or spatial/angular densities based on the desired structured light pattern.

The at least one light source 130 and the ToF sensor 110 could be temporally synchronized. That is, a trigger signal to cause the light source 130 to emit light could also be provided to the ToF imager 110 as a temporal reference signal. As such, the ToF sensor 110 may have information about a time of the actual onset of the light emitted from the light source 130. Additionally or alternatively, the ToF sensor 110 could be calibrated based on a reference target at a known distance from the ToF sensor 110.

In scenarios with multiple light sources and/or multiple ToF imagers, the multiple light sources could utilize time multiplexing or other types of signal multiplexing (e.g., frequency or code multiplexing) so as to disambiguate time-of-flight information (light pulses) obtained by a given ToF imager from the various light sources.

In some embodiments, the at least one light source 130 could be configured to emit light into an environment along a plurality of emission vectors toward various target locations so as to provide a desired resolution. In such scenarios, the at least one light source 130 could be operable to emit light along the plurality of emission vectors such that the emitted light interacts with an external environment of the system 100.

In an example embodiment, the respective emission vectors could include an azimuthal angle and/or an elevation angle (and/or corresponding angular ranges) with respect to a heading or location of a vehicle (e.g., vehicle 300 as illustrated and described with reference to FIG. 3A). In some embodiments, light emitted by the at least one light source 130 could be directed along the respective emission vectors by adjusting a movable mount and/or a movable mirror.

For example, the at least one light source 130 could emit light toward a movable mirror. By adjusting an orientation of the movable mirror, the emission vector of the light could be controllably modified. It will be understood that many different physical and optical techniques may be used to direct light toward a given target location. All such physical and optical techniques for adjusting an emission vector of light are contemplated herein.

Optionally, the system 100 may include other sensors 140. The other sensors 140 may include a LIDAR sensor, a radar sensor, or other types of sensors. For instance, system 100 could include a Global Positioning System (GPS), an Inertial Measurement Unit (IMU), a temperature sensor, a speed sensor, a camera, or a microphone. In such scenarios, any of the operational scenarios and/or methods described herein could include receiving information from the other sensors 140 and carrying out other operations or method steps based, at least in part, on the information received from the other sensors 140.

In an example embodiment, at least two of: the at least one ToF sensor 110, the imaging sensor 120, and the at least one light source 130 could be coupled to a common substrate. For example, the at least one ToF sensor 110, the imaging sensor 120, and the at least one light source 130 could be coupled to a vehicle. In some embodiments, some or all elements of system 100 could provide at least a portion of the object detection and/or navigation capability of the vehicle. The vehicle could be a semi-autonomous or fully-autonomous vehicle (e.g., a self-driving car). For instance, system 100 could be incorporated into vehicle 300 as illustrated and described in reference to FIGS. 3A, 4A, 4B, 6A, and 6B.

In some embodiments, system 100 could be part of a vehicle control system utilized to detect and potentially identify nearby vehicles, road boundaries, weather conditions, traffic signs and signals, and pedestrians, among other features within the environment surrounding the vehicle 300. For example, a vehicle control system may use depth map information to help determine control strategy for autonomous or semi-autonomous navigation. In some embodiments, depth map information may assist the vehicle control system to avoid obstacles while also assisting with determining proper paths for navigation.

While some examples described herein include system 100 as being incorporated into a vehicle, it will be understood that other applications are possible. For example, system 100 could include, or be incorporated into, a robotic system, an aerial vehicle, a smart home device, a smart infrastructure system, etc.

System 100 includes a controller 150. In some embodiments, the controller 150 could include an on-board vehicle computer, an external computer, or a mobile computing platform, such as a smartphone, tablet device, personal computer, wearable device, etc. Additionally or alternatively, the controller 150 can include, or could be connected to, a remotely-located computer system, such as a cloud server network. In an example embodiment, the controller 150 may be configured to carry out some or all of the operations, method blocks, or steps described herein. Without limitation, the controller 150 could additionally or alternatively include at least one deep neural network, another type of machine learning system, and/or an artificial intelligence system.

The controller 150 may include one or more processors 152 and at least one memory 154. The processor 152 may include, for instance, a microprocessor, an application-specific integrated circuit (ASIC), or a field-programmable gate array (FPGA). Other types of processors, circuits, computers, or electronic devices configured to carry out software instructions are contemplated herein.

The memory 154 may include a non-transitory computer-readable medium, such as, but not limited to, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

The one or more processors 152 of controller 150 may be configured to execute instructions stored in the memory 154 so as to carry out various operations and method steps/blocks described herein. The instructions may be stored in a permanent or transitory manner in the memory 154.

Figure 2:
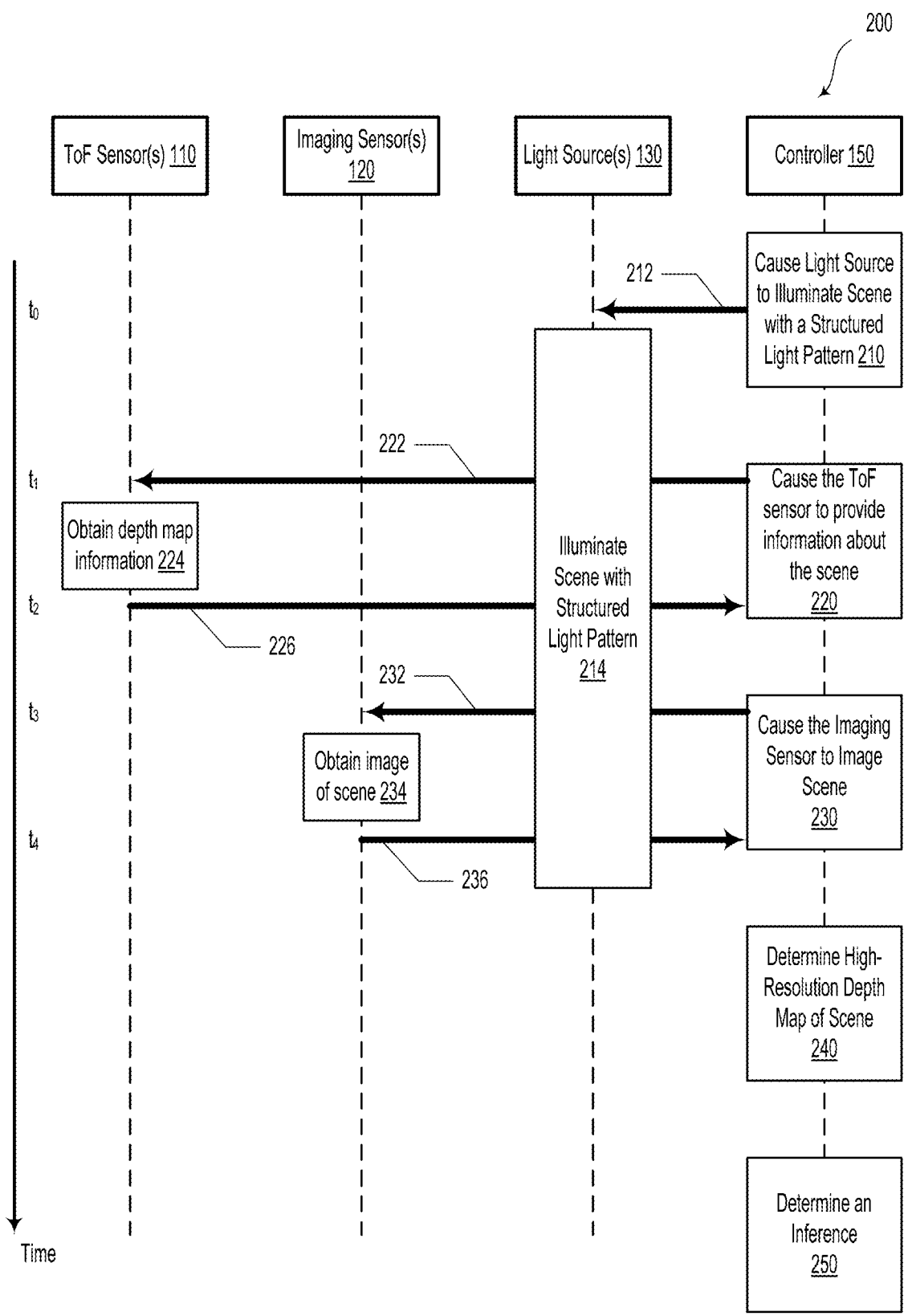
FIG. 2 illustrates an operating scenario of a system, according to example embodiments.

FIG. 2 illustrates an operating scenario 200 of the system 100, according to example embodiments. While the operating scenario 200 illustrates certain operations or blocks being in a certain order and being carried out by certain elements of system 100, it will be understood that other functions, orders of operations, and/or timing arrangements are contemplated herein.

Block 210 may include the controller 150 causing the at least one light source 130 to illuminate at least a portion of the scene with illumination light according to a structured light pattern. The structured light pattern could include, for example, at least one of: a predetermined light pulse repetition rate, a predetermined light pulse duration, a predetermined light pulse intensity, or a predetermined light pulse duty cycle.

In some embodiments, the structured light pattern could remain static over one or more scans within a given field of view. Alternatively or additionally, the structured light pattern could change dynamically. For example, the structured light pattern could be adjusted based on objects within the environment, a region of interest within the field of view; a time of day, presence of retroreflectors, etc. In some embodiments, the structured light pattern could include a checkerboard pattern, a speckle pattern, or a striped pattern.

In some example embodiments, in response to determining a retroreflector within a portion of a given field of view, the intensity of the sector that had illuminated the retroreflector could be "dialed down" (e.g., reducing a preamplifier gain or otherwise changing how a photosignal from that sector is processed in the analog and/or digital domain) and/or completely turned off or ignored to avoid blooming effects. In such a manner, the sensor may be better able to recover the remaining portions of the scene.

Periodically (e.g., once every few of frames within a maximum latency), the portion of field of view with the retroreflector could be illuminated again to track the presence of the retroreflector. If the sensor continues to indicate strongly saturated pixels in response to illumination (e.g., indicating that the retroreflective object is still present in that region of the field of view), high energy illumination will not be provided to the given region until such time that the system no longer observes a retroreflector in that region. Such dynamic illumination could reduce or eliminate stray light from retroreflectors and more reliably recover the remainder of the scene which might otherwise not produce reliable depth values. Without limitation, other types of spatial, temporal, and/or spectral light patterns are contemplated herein.

In an example embodiment, instruction 212 could include, for example, a signal from the controller 150 to the light source 130 at time to. The instruction 212 could be indicative of the desired structured light pattern and/or an illumination schedule, an illumination level, or an illumination direction or sector, among other examples.

In response to receiving the instruction 212, the light source 130 could carry out block 214 to illuminate the scene according to the structured light pattern. In some examples, the light source 130 could illuminate one or more light-emitter elements, which could be light-emitting diodes (LEDs), lasers, strobe lights, or another type of light source. Such light-emitter elements could be illuminated so as to provide the desired structured light pattern (e.g., provide light along a desired set of pointing/cone angles, illuminate light-emitter elements for a desired time, illuminate light-emitter elements at a desired frequency and duty cycle, etc.). In some embodiments, the light source 130 could include an optical element, such as one or more lenses, and/or a baffle so as to direct light toward a desired set of pointing angles and/or cone angle.

Block 220 includes causing the at least one ToF sensor 110 to provide information (e.g., time of flight information) indicative of a depth map of the scene based on the structured light pattern provided by the light source 130. For example, at time $t_1$, block 220 could include providing an instruction 222 from the controller 150 to the ToF sensor 110. The instruction 222 could include a signal to trigger a depth mapping function of the ToF sensor 110. Additionally or alternatively, the instruction 222 could include information indicative of a desired field of view for scanning, a desired range for scanning, a desired resolution, and/or other desired aspects of the depth map and/or ToF sensor scan.

Block 224 could include the ToF sensor 110 obtaining a depth map based, at least in part, on the structured light pattern provided by the light source 130. That is, in response to receiving the instruction 222, the ToF sensor 110 may carry out a depth-mapping scan of a field of view of a scene. In an example embodiment, the ToF sensor 110 could be operated between 10-100 MHz, however other operating frequencies are possible. In some embodiments, the operating frequency of the ToF sensor 110 may be adjusted based on a desired maximum depth sensing range. For instance, the ToF sensor 110 could be operated at 20 MHz for a desired depth sensing range of approximately 7.5 meters. In some embodiments, the ToF sensor 110 could have a maximum desired depth sensing range of 100 meters or more. In some embodiments that involve multiple ToF sensors, the ToF sensors could be configured to and/or instructed to carry out depth-mapping scans of different fields of view of the scene and/or over different distance ranges.

At time $t_2$, upon obtaining the depth map according to block 224, the ToF sensor 110 could provide information 226 to the controller 150. The information 226 may be indicative of the depth map of the scene. For example, the information 226 could include a distance-based point map of the scene. Additionally or alternatively, the information 226 could include a surface map of objects determined within the scene. Other types of information 226 are possible and contemplated.

Block 230 includes causing the imaging sensor 120 to provide information indicative of an image of the scene based on the structured light pattern provided by the light source 130. As an example, at time $t_3$, the controller 150 could provide an instruction 232 to the imaging sensor 120. The instruction 232 could include a signal for triggering an image capture function of the imaging sensor 120. Furthermore, the instruction 232 could include information regarding a desired exposure, ambient lighting level, ambient lighting color temperature, time of day, etc. While $t_1$ and $t_3$ are illustrated in FIG. 2 as being different, in some embodiments, times $t_1$ and $t_3$ could be similar or identical. That is, in some embodiments, at least some portions of the depth mapping and image capture processes could be triggered and conducted in parallel.

Block 234 includes, in response to receiving the instruction 232, the imaging sensor 120 obtaining an image of the scene illuminated by the structured light pattern. In other words, instruction 232 could trigger a physical shutter mechanism or a digital shutter so as to initiate an image capture process.

Upon capturing the image, at time $t_4$, the image sensor 120 could provide information 236 to the controller 150. The information 236 could include, for example, the captured image as well as other information, such as metadata regarding the captured image (e.g., exposure time, aperture setting, imager sensitivity (ISO), field of view extents, etc.). In some embodiments, the information 236 could include RAW image data, however other uncompressed and compressed image data formats (BMP, JPEG, GIF, PNG, TIFF, etc.) are possible and contemplated.

Block 240 could include determining a high-resolution depth map of the scene based on the depth map of the scene (e.g., information 226) and the image of the scene (e.g., information 236). In an example embodiment, the depth map information 226 and the image information 236 could be compared and/or correlated using various image processing algorithms. Such algorithms may include, without limitation, texture synthesis, image resampling algorithms, interpolation algorithms, image sharpening algorithms, edge-detection algorithms, and image blurring algorithms, etc. As such, the high-resolution depth map could include depth information about the scene with a higher spatial resolution than that of the depth map obtained by the ToF sensor 110. In some embodiments, the spatial resolution could relate to a target resolution at a given distance away from the system 100. Other spatial resolutions, both along a two-dimensional surface and within three-dimensional space, are possible and contemplated herein. As an example, the depth map obtained by the ToF sensor 110 could provide a spatial resolution between adjacent sampling points of 10 centimeters at a range of 20 meters. The high-resolution depth map could provide a spatial resolution of less than 5 centimeters at a range of 20 meters. In other embodiments, a high-resolution depth map could include other spatial resolutions that may be sufficient to sense objects (e.g., other vehicles, pedestrians, obstacles, signs, signals, etc.) within a field of view of the system 100.

Block 250 may include determining at least one inference about the scene based on the depth map of the scene and, optionally, the image of the scene. For example, the controller 150 could determine at least one inference about the scene based on the high-resolution depth map determined in block 240. In such a scenario, the at least one inference may include information about one or more objects in an environment of a vehicle or an operating context of the vehicle. In scenarios where the controller 150 includes a deep neural network, block 250 could be performed, at least in part, by the deep neural network.

While the operating scenario 200 describes various operations or blocks 210, 220, 230, 240, and 250 as being carried out by the controller 150, it will be understood that at least some of the operations of operating scenario 200 could be executed by one or more other computing devices.

While operating scenario 200 describes various operations, it will be understood that more or fewer operations are contemplated. For example, the operations could further include selecting an illumination schedule from among a plurality of possible illumination schedules so as to provide a desired exposure for the imaging sensor 120.

Figure 3A:
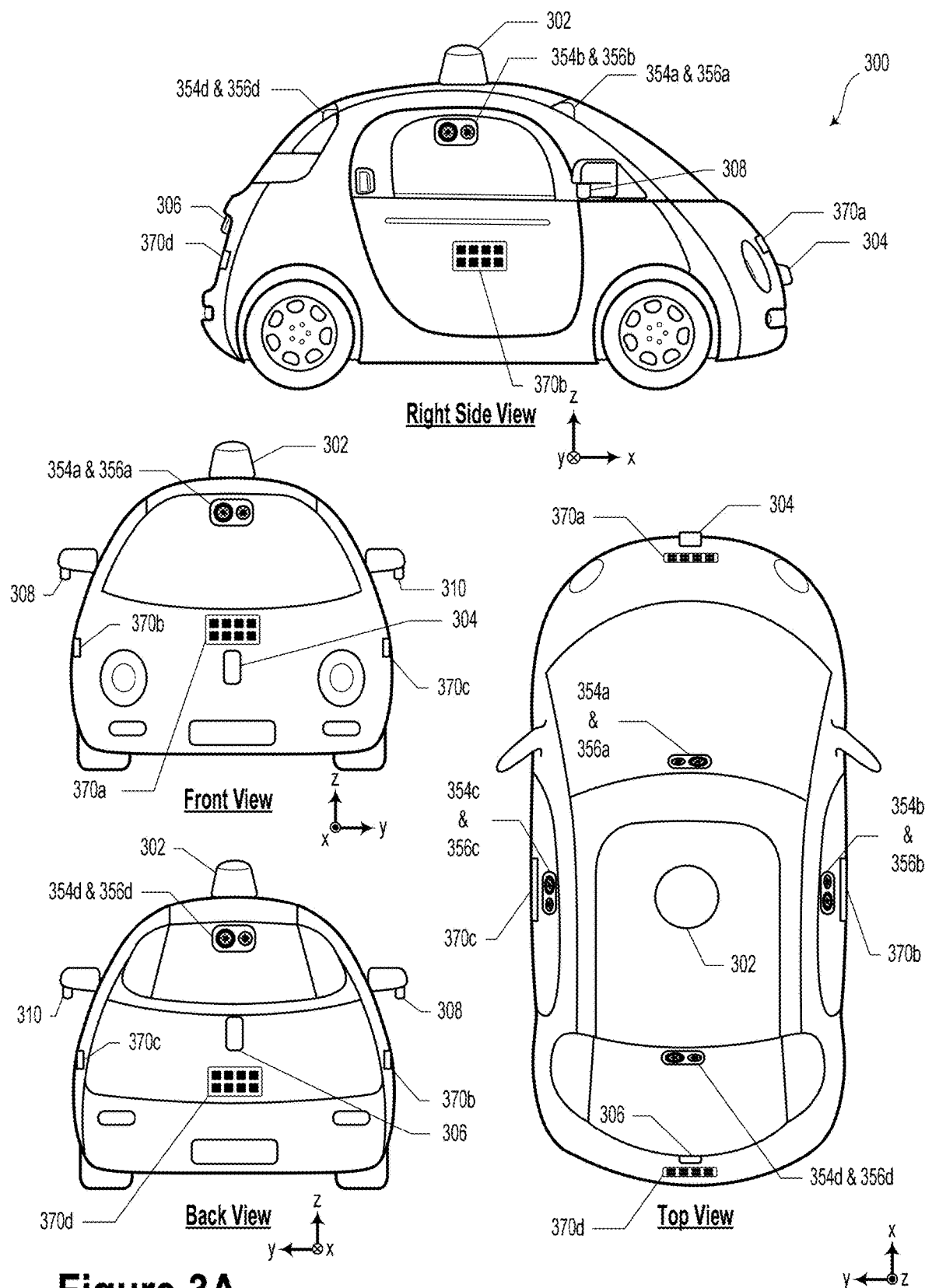
FIG. 3A illustrates a vehicle, according to an example embodiment.
Figure 3B:
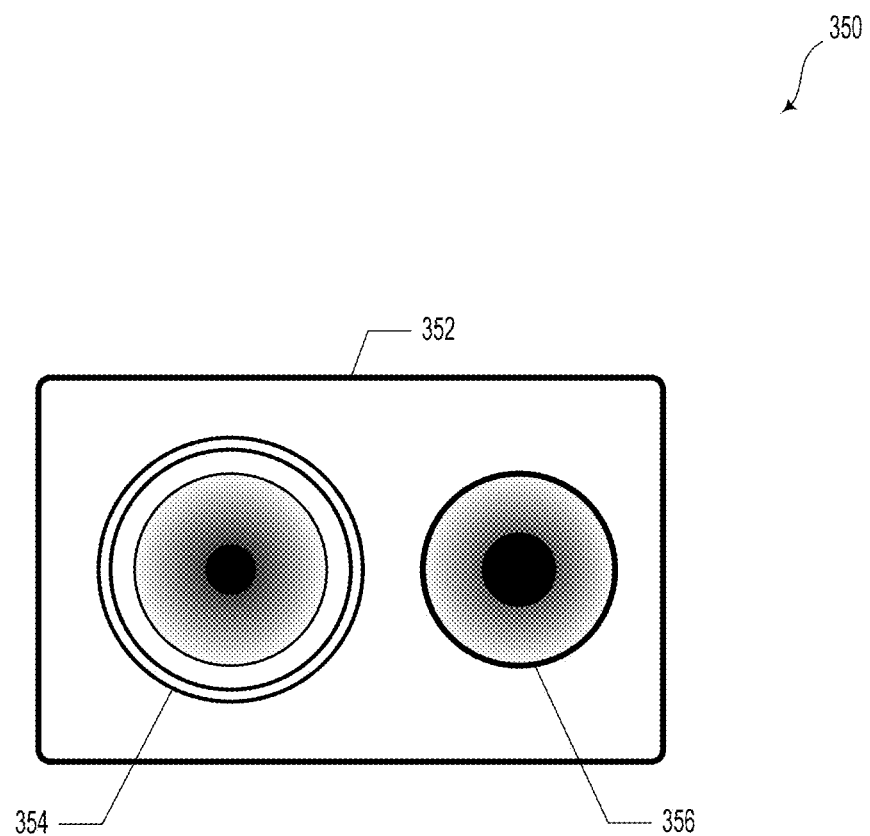
FIG. 3B illustrates a sensor unit, according to an example embodiment.
Figure 3C:
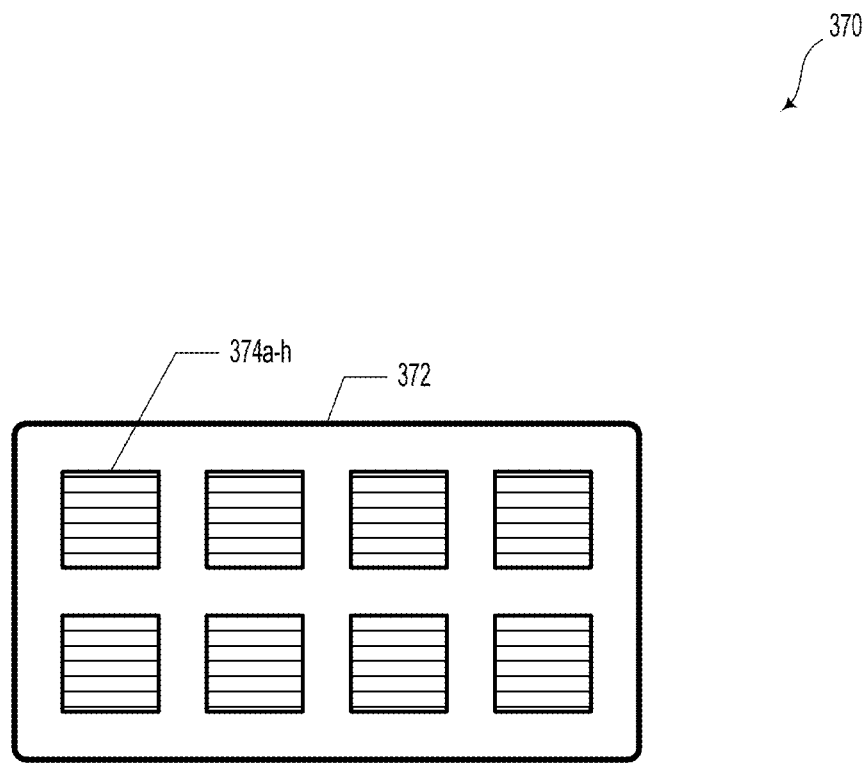
FIG. 3C illustrates a light source, according to an example embodiment.

FIGS. 3A, 3B, and 3C illustrate various embodiments of the system 100 and its elements. FIG. 3A illustrates a vehicle 300, according to an example embodiment. The vehicle 300 may include one or more sensor systems 302, 304, 306, 308, 310, 354a-d, and 356a-d. In some examples, the one or more sensor systems 302, 304, 306, 308, and 310 could include LIDAR and/or radar sensor units. One or more of the sensor systems 302, 304, 306, 308, and 310 may be configured to rotate about an axis (e.g., the z-axis) perpendicular to the given plane so as to illuminate an environment around the vehicle 300 with light pulses and/or radar energy. Additionally or alternatively, one or more of the sensor systems 302, 304, 306, 308, and 310 could include a movable mirror so as to direct emitted light pulses and/or radar energy in the environment of the vehicle 300. For LIDAR-based sensors, determining various aspects of reflected light pulses (e.g., the elapsed time of flight, polarization, etc.,) may provide information about the environment as described herein. Similarly, radar-based sensors may determine information about a given scene based on how radar energy interacts with the environment.

In an example embodiment, sensor systems 302, 304, 306, 308, and 310 may be configured to provide respective point cloud information or other types of information (e.g., maps, object databases, etc.) that may relate to physical objects within the environment of the vehicle 300. While vehicle 300 and sensor systems 302 and 304 are illustrated as including certain features, it will be understood that other types of sensors are contemplated within the scope of the present disclosure.

FIG. 3B illustrates a front view of sensor unit 350, according to an example embodiment. Sensor unit 350 could include a housing 352. In some embodiments, the housing 352 could be coupled to, or integrated into, the vehicle 300. In an example embodiment, the sensor unit 350 may optionally include an imaging sensor 354, which could be similar or identical to imaging sensor 120, as illustrated and described in reference to FIG. 1. Additionally, the sensor unit 350 could include a ToF sensor 356, which could be similar or identical to ToF sensor 110, as illustrated and described in reference to FIG. 1. While FIG. 3B illustrates imaging sensor 354 and ToF sensor 356 as being disposed within a common housing 352, the imaging sensor 354 and ToF sensor 356 could be disposed in different locations. It will be understood that other arrangements of such elements are possible and contemplated herein.

FIG. 3C illustrates a light source 370, according to an example embodiment. Light source 370 could include a housing 372. In some embodiments, the housing 372 could be coupled to, or integrated into, the vehicle 300. In an example embodiment, the light source 370 may include a plurality of light-emitting elements 374a-h, which could be similar or identical to light source 130, as illustrated and described in reference to FIG. 1. Light-emitting elements 374a-h could be disposed in an array or in another spatial arrangement. In an example embodiment, the light-emitting elements 374a-h could be light-emitting diodes (LEDs) or laser diodes. Other types of light sources are possible and contemplated.

The light-emitting elements 374a-h could be configured to emit light in the infrared (e.g., near infrared 700-1050 nm) wavelength range. However, in some embodiments, other wavelengths of light are contemplated (e.g., 1550 nm). In some embodiments, the light-emitting elements 374a-h could be configured to emit light at different wavelengths from each other. That is, the light-emitting elements 374a-h could be configured to emit light at eight different wavelengths. In such scenarios, system 100 and/or vehicle 300 could be configured to disambiguate light signals emitted by discrete light-emitting elements (or between different light sources 370) based on its wavelength. In some embodiments, the multi-color light could be received by multi-color imaging sensors and/or multi-color ToF sensors.

In some embodiments, light-emitting elements 374a-h could include one or more optical elements configured to interact with the light emitted from the light-emitting elements 374a-h. Without limitation, the one or more optical elements could be configured to redirect, shape, attenuate, amplify, or otherwise adjust the emitted light. For example, the one or more optical elements could include a mirror, an optical fiber, a diffractive optic element, an aspherical lens, a cylindrical lens, or a spherical lens. Other types of optical elements are possible and contemplated.

In some example embodiments, the light-emitting elements 374a-h could be operable so as to emit light toward different spatial sectors (e.g., including different azimuthal angle ranges and/or elevation angle ranges) of the environment around vehicle 300. Furthermore, in some embodiments, the light-emitting elements 374a-h could be operable to emit light at different times during a given period of time. That is, each of the light-emitting elements 374a-h could be controlled to emit light during respective time periods over a given time span. For example, the light-emitting elements 374a-h could emit light in a serial pattern (e.g., one light-emitting element lit after another in a "chase" pattern). Additionally or alternatively, one or more of the light-emitting elements 374a-h could emit light in a parallel fashion (e.g., several light-emitting element emitting light simultaneously).

Returning to FIG. 3A, vehicle 300 could include a plurality of sensor units, which could be similar or identical to sensor unit 350, as illustrated and described in reference to FIG. 3B. Furthermore, the respective sensor units could each include imaging sensors 354a-d and ToF sensors 356a-d. As illustrated, the respective pairs of imaging sensors 354a-d and ToF sensors 356a-d could be coupled to, or integrated into, a front, right side, left side, and rear portion of the vehicle 300. Other mounting types and mounting locations are contemplated for the imaging sensors 354a-d and ToF sensors 356a-d. For example, in some embodiments, the imaging sensors 354a-d and ToF sensors 356a-d could be disposed in a rotatable mount configured to rotate about the z-axis so as to obtain imaging information and ToF information from an environment around the vehicle 300.

While sensor systems 354a/356a, 354b/356b, 354c/356c, and 354d/356d are illustrated as being collocated, it will be understood that other sensor arrangements are possible and contemplated. Furthermore, while certain locations and numbers of sensor systems are illustrated in FIGS. 3A-3C, it will be understood that different mounting locations and/or different numbers of the various sensor systems are contemplated.

Vehicle 300 could include a plurality of light sources 370a-d, which could be similar or identical to light source 130, as illustrated and described in reference to FIG. 1. As illustrated, light source 370a-d could be coupled to, or integrated into, a front, right side, left side, and rear portion of the vehicle 300. Other mounting types and mounting locations are contemplated for the plurality of light sources 370a-d. For example, in some embodiments, the light source 370 could be disposed in a rotatable mount configured to rotate about the z-axis so as to emit light toward a controllable azimuthal angle range.

Figure 4A:
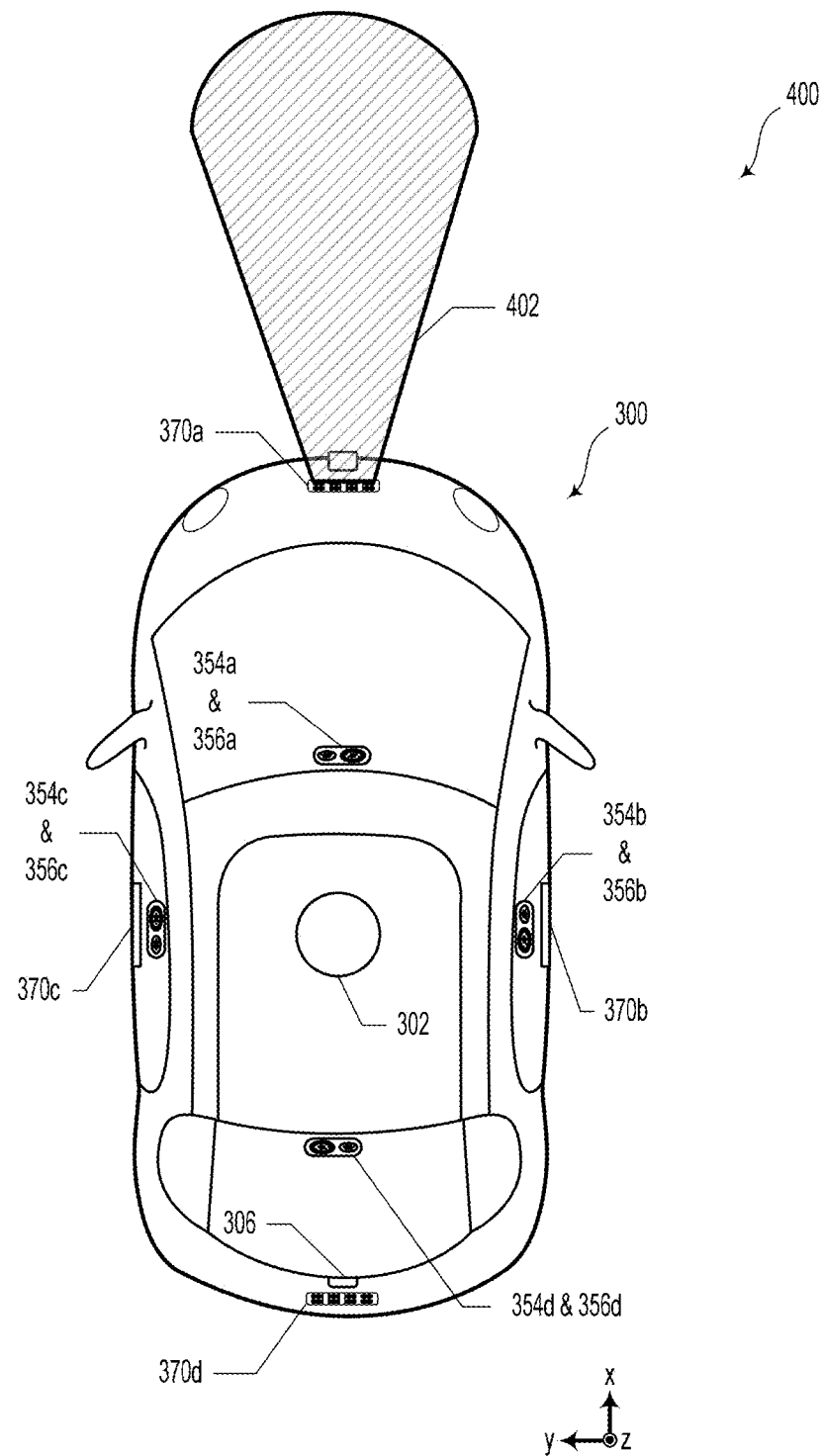
FIG. 4A illustrates a sensing scenario, according to an example embodiment.
Figure 4B:
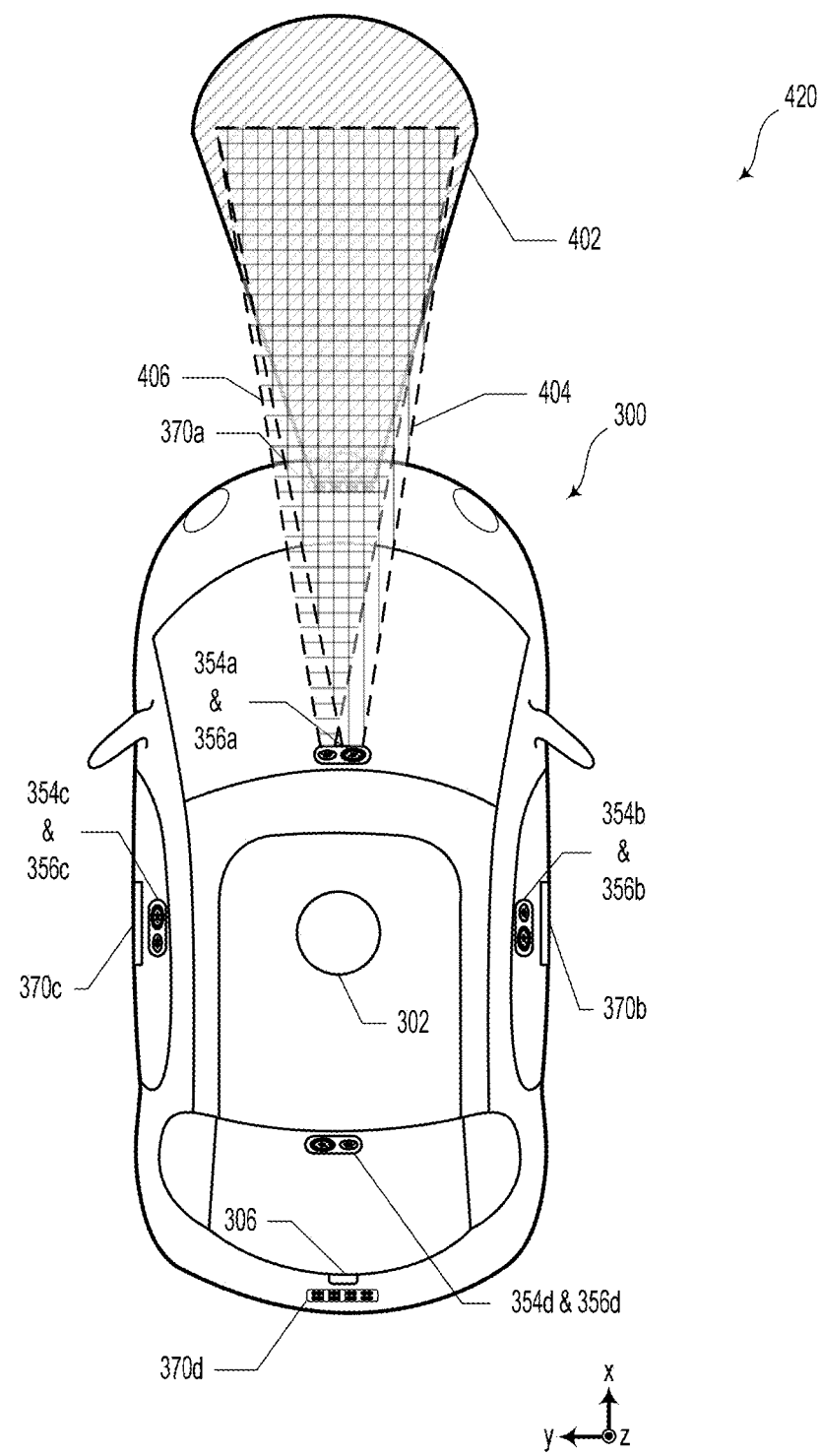
FIG. 4B illustrates a sensing scenario, according to an example embodiment.

FIG. 4A-4B illustrate various sensing scenarios 400 and 420. In each case, for purposes of clarity, the sensing scenarios 400 and 420 may illustrate a subset of possible spatial sectors and sensor profiles/ranges. It will be understood that other spatial sectors are possible and contemplated within the scope of the present disclosure. Furthermore, it will be understood that the sensing scenarios 400 and 420 may illustrate only single "snapshots" in time and that spatial sectors and sensor profiles/ranges could be dynamically adjusted so as to periodically or continuously change based on, among other factors, a dynamically-changing operating context of the vehicle 300.

FIG. 4A illustrates an overhead/top view of vehicle 300 in a sensing scenario 400, according to an example embodiment. Sensing scenario 400 includes illuminating a front-facing sector of an environment of the vehicle 300 with structured light pattern 402. For example, light source 370a could emit light from one or more light-emitting elements so as to illuminate the front-facing sector of the vehicle 300 with the structured light pattern 402.

The structured light pattern 402 could be provided according to a pulsed illumination schedule or a continuous-wave illumination schedule. Other types of illumination schedules are contemplated. For example, the structured light pattern 402 could be provided "on-demand" from controller 150 or based on the operating context of the vehicle 300. As an example, the structured light pattern 402 could be provided in low-light conditions (e.g., at night) or in response to determining an object in the environment of the vehicle 300. As a non-limiting example, another sensor system of the vehicle 300 could identify an ambiguous or unknown object (not illustrated) ahead of the vehicle 300. The ambiguous or unknown object could be identified for further analysis. In such a scenario, the controller 150 could cause the light source 370a to provide the structured light pattern 402 to the front-facing sector.

While FIG. 4A illustrates a front-facing sector as being illuminated, in some embodiments, the light source 370a may be configured to adjust a pointing direction of the structured light pattern 402. It will also be understood that the other light sources 370b-d could provide similar structured light patterns into various spatial sectors corresponding with their respective positions. For example, light source 370d could emit light according to the structured light pattern into a rear-facing spatial sector.

It will be understood that while the structured light pattern 402 and spatial sectors appear as being two-dimensional in FIG. 4A-4B, three-dimensional spatial volumes are contemplated. For example, the structured light pattern 402 and/or spatial sectors could be defined as between an azimuthal angle range and also between a maximum elevation angle and a minimum elevation angle.

FIG. 4B illustrates an overhead/top view of the vehicle 300 in a sensing scenario 420, according to an example embodiment. Sensing scenario 420 could include imaging sensor 354a obtaining light from a field of view 404. At least a portion of the light obtained by the imaging sensor 354a could include reflected or refracted light after the structured light pattern 402 interacts with the environment of the vehicle 300. The field of view 404 could include a front-facing spatial sector of the vehicle 300. In some embodiments, the field of view 404 of the imaging sensor 354a could partially or fully overlap with the volume illuminated by the structured light pattern 402. Based on the light obtained from field of view 404, the imaging sensor 354a may provide an image of the scene based, at least in part, on the structured light pattern 402.

Sensing scenario 420 also illustrates ToF sensor 356a obtaining light from a field of view 406. At least a portion of the light obtained by the ToF sensor 356a could be from structured light pattern 402 that has interacted with the environment of the vehicle 300. The field of view 406 could include a front-facing spatial sector of the vehicle 300. In some embodiments, the field of view 406 of the ToF sensor 356a could partially or fully overlap with the volume illuminated by structured light pattern 402. Based on the light obtained from field of view 406, the ToF sensor 356a may provide a depth map of the scene based, at least in part, on the structured light pattern 402.

Figure 4C:
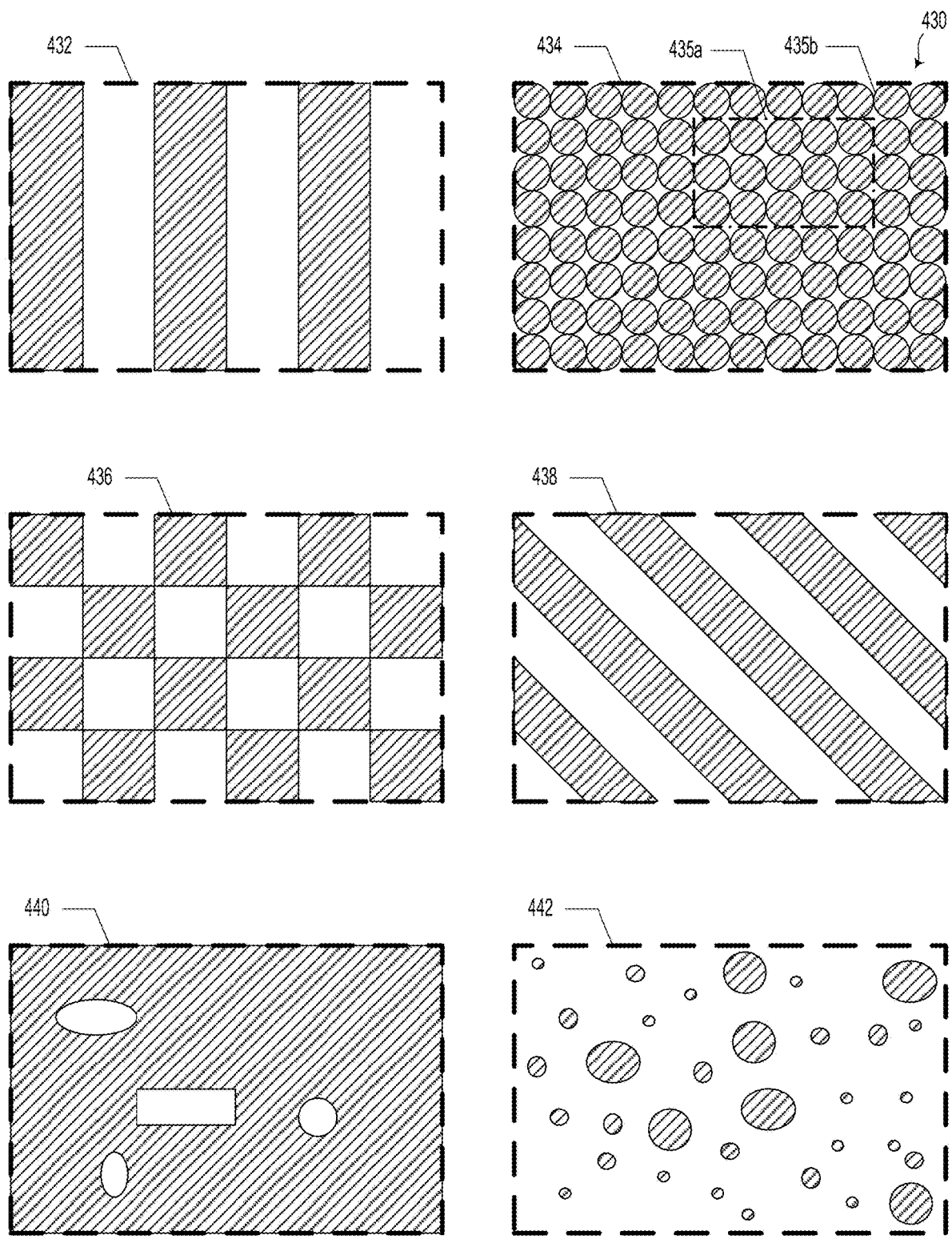
FIG. 4C illustrates various structured light patterns, according to example embodiments.

FIG. 4C illustrates various structured light patterns 430, according to example embodiments. The various structured light patterns 430 could include, for example, a vertical striped structured light pattern 432, a dot array structured light pattern 434, a checkerboard structured light pattern 436, a diagonal striped structured light pattern 438, a "dropout" structured light pattern 440, and/or a speckle structured light pattern 442.

Figure 4D:
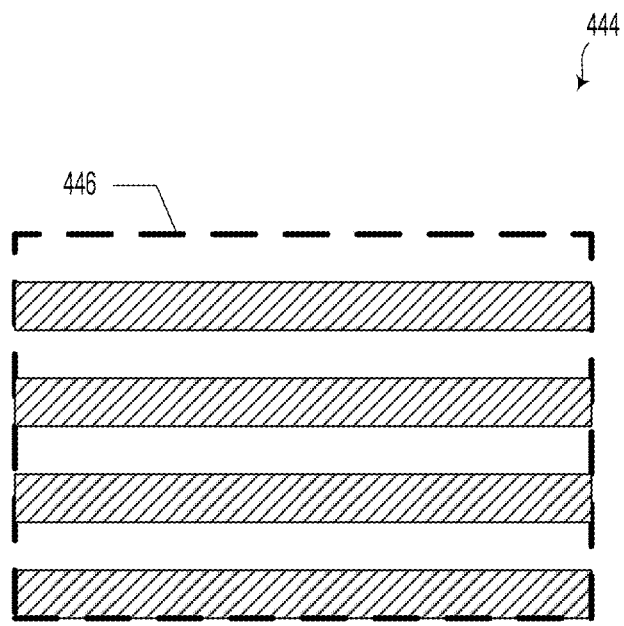
FIG. 4D illustrates a structured light pattern, according to an example embodiment.

FIG. 4D illustrates a structured light pattern 444, according to an example embodiment. As an example, structured light pattern 444 could include a horizontal striped structured light pattern 446. It will be understood that other structured light patterns are possible and each is contemplated without limitation.

In some embodiments, an illumination level (e.g., brightness) of some or all portions of the structure light patterns 430 could be dynamically adjusted based on objects within the scene and/or prior information about the scene. As an example, the amount of illumination provided to various portions of the scene could be based on the presence of predicted or known highly-retroreflective objects. In a scenario, the ToF sensor could capture an initial scan of the scene while illuminating the scene at a relatively low illumination level. As an example, the initial scan could include a brief (e.g., 10 microsecond) illumination period. Such an initial scan could provide information about retroreflectors present within the scene. A subsequent scan of the scene could be performed at a relatively high illumination level (e.g., 100 microsecond illumination period, or longer) for portions of the scene where the retroreflectors are not present. The subsequent scan could include illuminating the portions of the scene having the retroreflectors at a relatively low illumination level to confirm the presence of a highly reflective object.

For example, in reference to FIG. 4C, if a retroreflective region 435a is identified within a given scene during an initial scan, then illumination of that retroreflective region 435a could be reduced with respect to other regions 435b of the scene during a subsequent scan. By dynamically adjusting the illumination level within the scene, potential blooming issues and/or other problems relating to retroreflectors could be avoided or reduced on a near-real-time basis. Other ways to differentially illuminate certain portions of the scene with respect to other portions of the scene are contemplated and possible.

III. Example Methods

Figure 5:
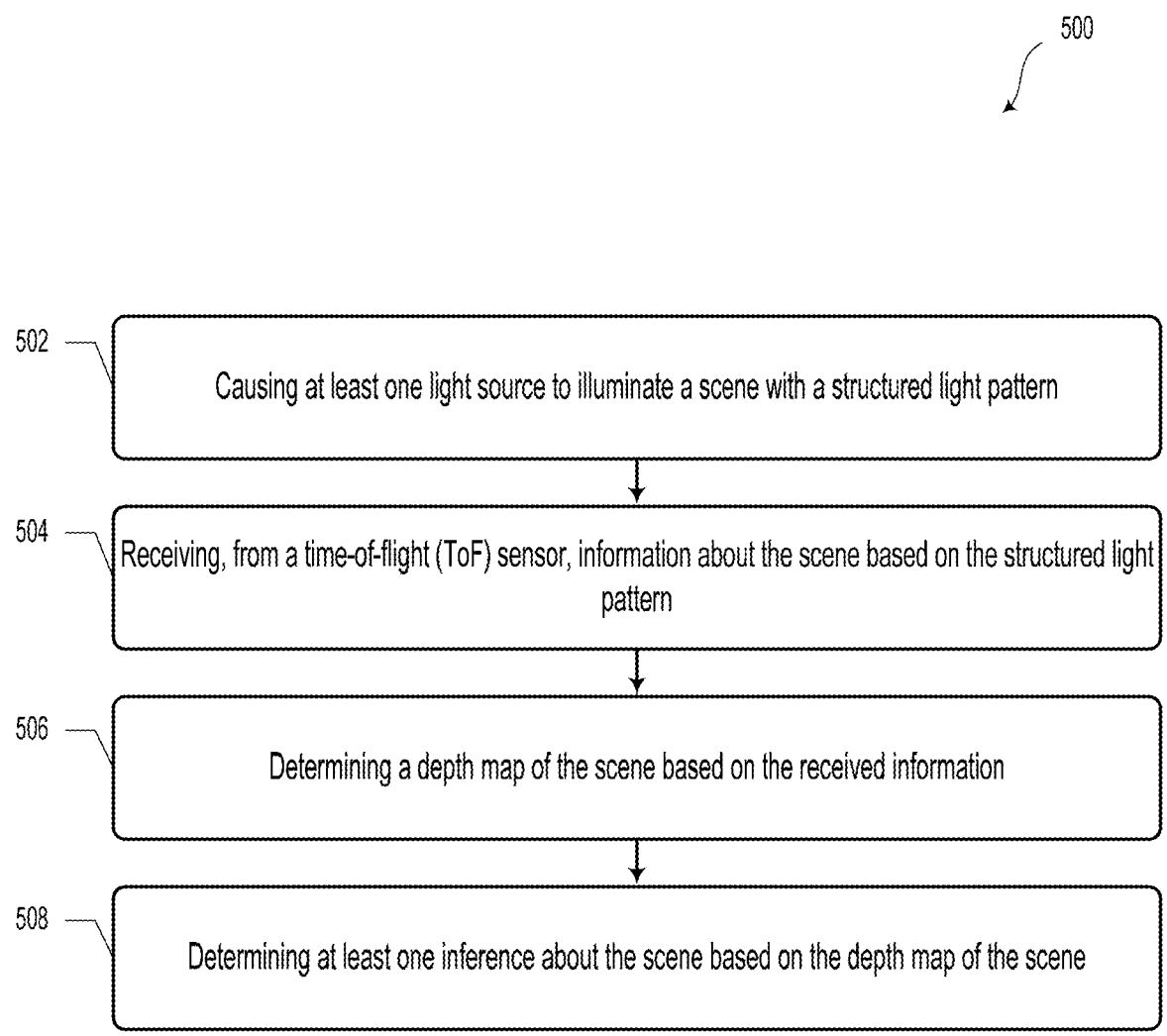
FIG. 5 illustrates a method, according to an example embodiment.

FIG. 5 illustrates a method 500, according to an example embodiment. It will be understood that the method 500 may include fewer or more steps or blocks than those expressly illustrated or otherwise disclosed herein. Furthermore, respective steps or blocks of method 500 may be performed in any order and each step or block may be performed one or more times. In some embodiments, some or all of the blocks or steps of method 500 may be carried out by elements of system 100. For example, some or all of method 500 could be carried out by controller 150, ToF sensor(s) 110, and/or imaging sensor(s) 120 as illustrated and described in relation to FIG. 1. Furthermore, method 500 may be described, at least in part, by the operating scenario 200, as illustrated in relation to FIG. 2. Yet further, method 500 may be carried out, at least in part, by vehicles 300 or 400 as illustrated and described in relation to FIG. 3A, 4A, 4B, 6A, or 6B. Method 500 may be carried out in scenarios similar or identical to scenario 400 as illustrated and described in relation to FIGS. 4A, 4B, and 4C. It will be understood that other scenarios are possible and contemplated within the context of the present disclosure.

Block 502 includes causing at least one light source to illuminate a scene with a structured light pattern. The structured light pattern could be similar or identical to structured light pattern 402, 432, 434, 436, 438, 440, and 442, as illustrated and described in FIGS. 4A, 4B, and 4C. In example embodiments, the structured light pattern could include at least one of: a temporal light pattern, a spatial light pattern, a predetermined light pulse repetition rate, a predetermined light pulse duration, a predetermined light pulse intensity, or a predetermined light pulse duty cycle.

Block 504 includes receiving, from a time-of-flight (ToF) sensor, information (e.g., time of flight information) about the scene based on the structured light pattern. In an example embodiment, the controller 150 could cause the ToF sensor to initiate a depth scan based on the structured light pattern. In some embodiments, a clock signal or trigger signal could be provided to the ToF sensor to synchronize it with the one or more light pulses emitted into the environment. Upon obtaining depth map information, the ToF sensor could provide to the controller 150 information indicative of the depth map to the controller 150 or another element of the system 100.

Block 506 includes determining a depth map of the scene based on the received information. For example, determining the depth map of the scene could include calculating distances to objects in the environment based on the time of flight of light pulses emitted into the environment. Other ways to determine the depth map of the scene based on the received information are contemplated.

Optionally, method 500 could include causing an imaging sensor to provide information indicative of an image of the scene based on the structured light pattern. In some embodiments, the controller 150 could trigger a mechanical or electronic shutter of the imaging sensor to open and obtain an image of the scene. Additionally or alternatively, the controller 150 could provide information about the scene (e.g., ambient light level, specific sectors of concern, desired resolution, time of day, etc.). Furthermore, the controller 150 or the light source 130 could provide a clock signal or trigger signal so as to synchronize the imaging sensor and light source. Upon obtaining the image of the scene, the imaging sensor could provide information indicative of the image to the controller 150 or another element of system 100.

Additionally or alternatively, method 500 could include selecting a desired structured light pattern from among a plurality of possible structured light patterns. In some embodiments, the desired structured light pattern could be selected so as to provide a desired exposure for the imaging sensor. Additionally or alternatively, selecting the desired structured light pattern could be based on a number of variables, including external light level, other light sources, angle of sun, etc. As such, method 500 could include selecting and/or adjusting the structured light pattern based on an amount of ambient light (e.g., as measured from an ambient light sensor), a time of day, and/or weather condition.

Optionally, method 500 could include determining a high-resolution depth map (e.g., a depth map with higher resolution than that provided by the ToF sensor individually) of the scene based on the depth map of the scene and the image of the scene.

Block 508 includes determining at least one inference about the scene based on the depth map of the scene and, optionally, the image of the scene. In some embodiments, the at least one inference could include information about one or more objects in an environment of a vehicle or an operating context of the vehicle.

In example embodiments, determining the at least one inference could be performed by at least one deep neural network. Additionally or alternatively, some or all blocks of method 500 could be carried out by computing systems implementing other types of artificial intelligence-based algorithms.

Figure 6A:
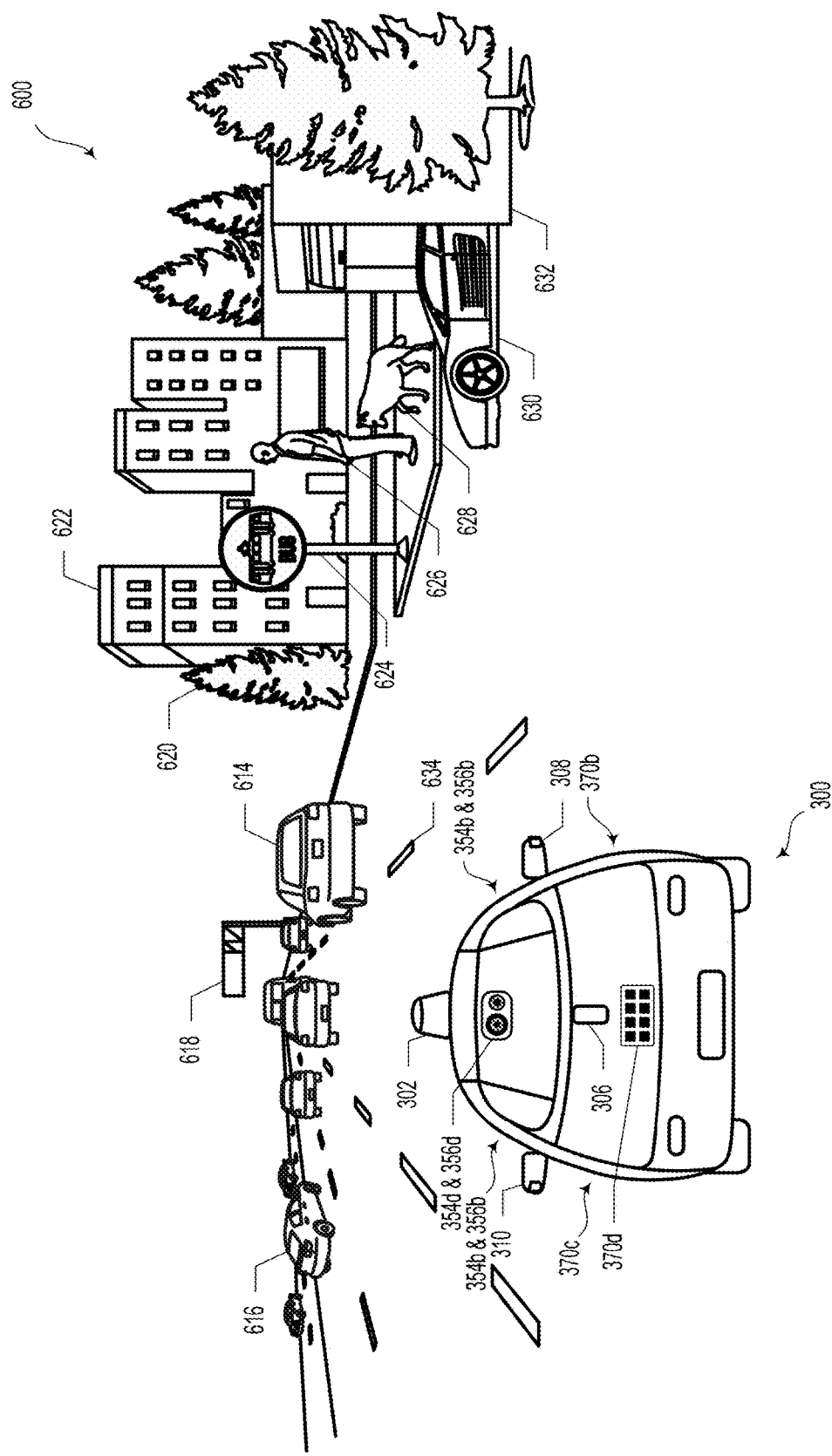
FIG. 6A illustrates a sensing scenario, according to an example embodiment.
Figure 6B:
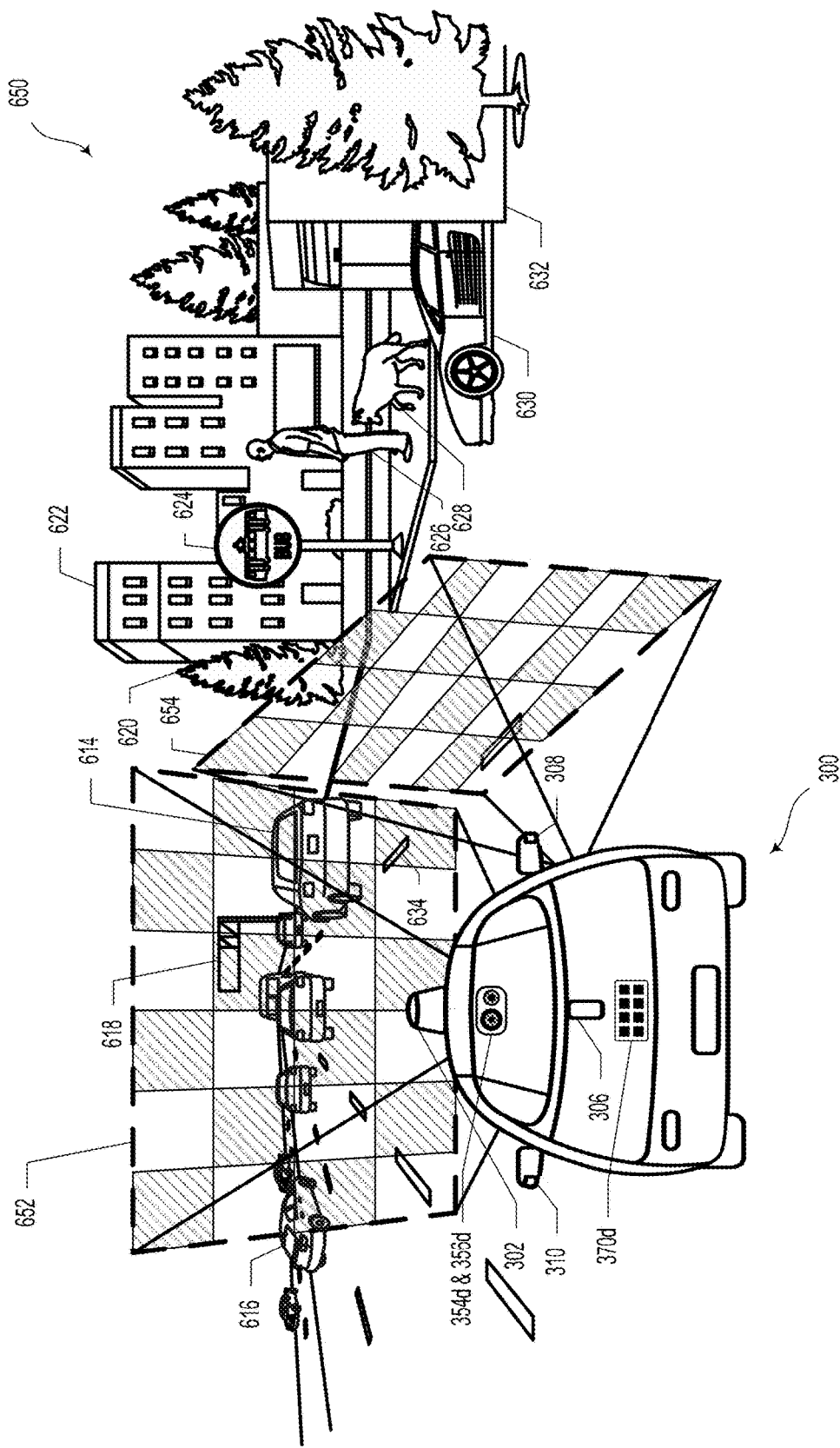
FIG. 6B illustrates a sensing scenario, according to an example embodiment.

FIGS. 6A and 6B illustrate sensing scenarios in the context of the present disclosure. The sensing scenarios could relate to system 100 (e.g., as illustrated and described in reference to FIG. 1), vehicle 300 (e.g., as illustrated and described in reference to FIGS. 3A, 4A, and 4B), and method 500 (e.g., as illustrated and described in reference to FIG. 5).

FIG. 6A illustrates a sensing scenario 600, according to an example embodiment. As illustrated in FIG. 6A, a vehicle 300 could be operating in an environment that includes one or more objects. As shown, the vehicle 300 includes sensor units 302, 306, 308, and 310. For instance, the sensor unit 302 may include a first LIDAR (not shown) and a second LIDAR (not shown). Further, for instance, each of the sensor units 306, 308, and 310 may also include a LIDAR. As shown, the vehicle 300 may additionally include imaging sensors 354a-d, ToF sensors 356a-d and light sources 370a-d. It will be understood that the vehicle 300 could include different numbers and/or arrangements of imaging sensors 354a-d, ToF sensors 356a-d, and/or light sources 370a-d.

As shown, the environment of the vehicle 300 includes various objects such as cars 614 and 616, road sign 618, tree 620, building 622, street sign 624, pedestrian 626, dog 628, car 630, driveway 632, and lane lines including lane line 634. In some embodiments, these objects have different reflectivities, which can make it more difficult to obtain accurate depth map information. In accordance with the present disclosure, the vehicle 300 may perform the methods and processes herein, such as method 500, to facilitate autonomous operation of the vehicle 300 and/or accident avoidance by the vehicle 300.

FIG. 6B illustrates a sensing scenario 650, according to an example embodiment. In some embodiments, the vehicle 300 and its associated light sources could emit light into its environment according to one or more structured light patterns 652 and 654. For example, as illustrated, a right-facing light source could illuminate the environment with structured light pattern 654, which could include a checkerboard pattern. Furthermore, a front-facing light source could illuminate the environment with structured light pattern 652.

Other scenarios are possible as well. Thus, the present methods and systems may facilitate autonomous operation and/or accidence avoidance for a vehicle such as the vehicle 300 by utilizing one or more ToF sensors in combination with light sources that are configured to illuminate the environment with structured light patterns.

Systems and methods described herein may involve prior information about the environment. Such prior information could include a high-fidelity three-dimensional model of the local environment of a vehicle and/or within a scene of the ToF sensor. In such scenarios, the prior information could reside, at least in part, at the vehicle and/or at a central or regional server.

In some embodiments, the prior information may be utilized in combination with the ToF information/depth map to better calibrate the sensors and/or to better localize the vehicle. That is, a comparison between the prior information and at least one depth map could help determine intrinsic and extrinsic characteristics of the ToF sensor. In such scenarios, the determined intrinsic and/or extrinsic characteristics could be used to calibrate the ToF sensor. Additionally or alternatively, a comparison between the prior information and the at least one depth map could include aligning or registering the prior information with the at least one depth map. In so doing, the alignment/registration process could help determine a more-accurate absolute position, heading, speed, or other characteristics of the vehicle and/or other aspects of its environment. In other words, the prior information could be utilized in conjunction with the at least depth map to provide more accurate information about the vehicle than the sensor information taken alone. In such scenarios, the prior information could represent a reference frame within which the vehicle could be localized.

Figure 7:
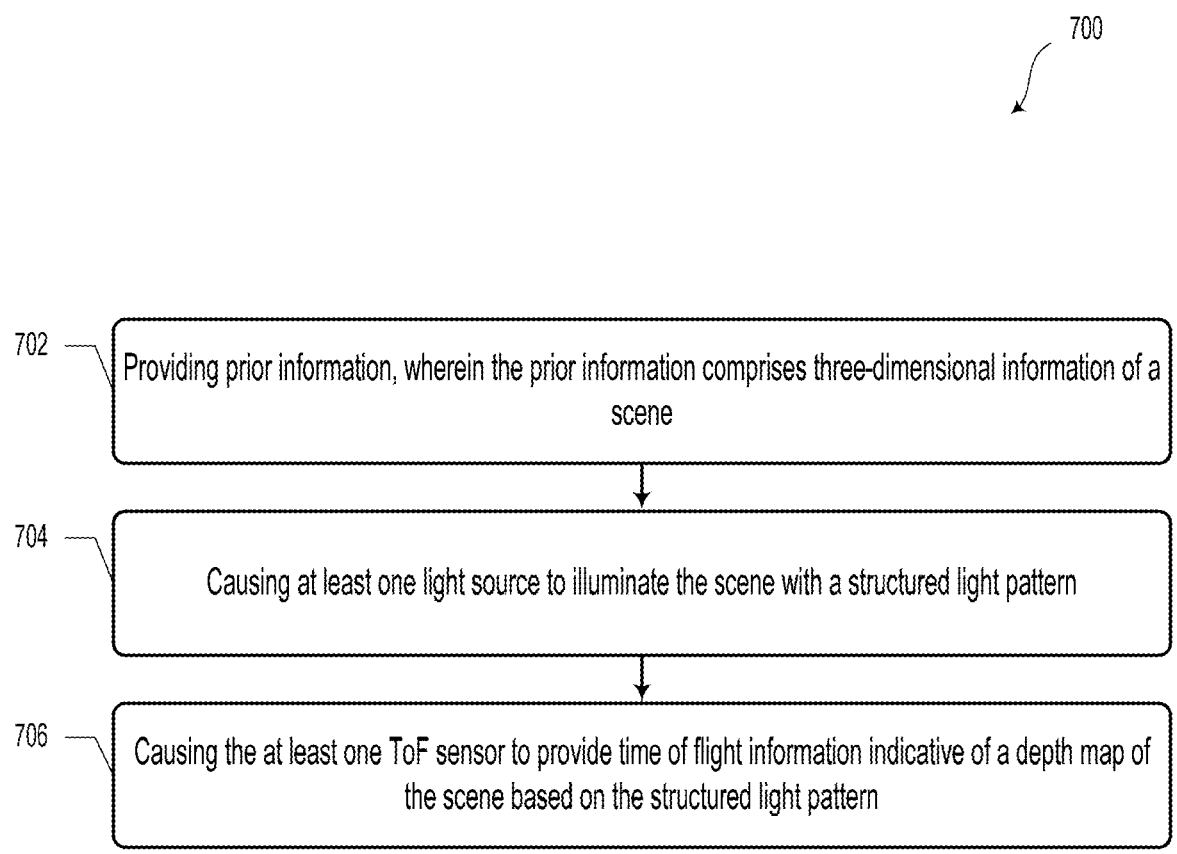
FIG. 7 illustrates a method, according to an example embodiment.

FIG. 7 illustrates a method 700, according to an example embodiment. Blocks and/or elements of method 700 could be similar or identical to corresponding elements of methods 500 or 600, as illustrated and described in reference to FIGS. 5 and 6

Block 702 includes providing prior information, which includes three-dimensional information of a scene. The prior information could include, for example, image, ToF, and/or LIDAR data obtained previously. Prior information could additionally or alternatively include a map, a point cloud, or depth map, or other types of information.

Block 704 includes causing at least one light source to illuminate the scene with a structured light pattern. The structured light pattern could be similar or identical to other structured light patterns described herein.

Block 706 includes causing the at least one ToF sensor to provide time of flight information indicative of a depth map of the scene based on the structured light pattern. As described herein, the ToF sensor could be operated while illuminating the scene with the structured light pattern. Doing so may provide more detailed information about the depth of objects in the scene.

Additionally or alternatively, the prior information could be utilized to improve depth estimation. In such a scenario, the prior information could be projected into the depth map(s). Various methods (e.g., ray tracing, Principle Components Ordination (PCoA), Non-metric Multidimensional Scaling (NMDS), or other methods) could be used to perform the projection of three-dimensional prior information onto the depth map, each of which are contemplated herein. By projecting the prior information into the depth map, depth information could double-checked, calibrated, verified, and/or estimated more accurately.

Yet further, the prior information could be utilized to perform background subtraction. In such a scenario, the prior information could include information about objects that are outside a relevant sensor depth (e.g., far away from the vehicle). In such situations, depth map information corresponding to objects that are outside the relevant sensor depth could be ignored, discounted, deleted, and/or processed at a lower resolution than other, more relevant, regions of the environment.

Additionally, the prior information could be used, at least in part, to determine where retroreflective objects may be within a given environment. When a vehicle (and its ToF imaging system(s)) enter such an environment, it can adjust operation of the system so as to mitigate the effects of the retroreflective objects. For instance, the system could illuminate the environment corresponding to a known retroreflective object at a lower intensity level as compared to other regions of the environment. In such a scenario, the hybrid imaging system can avoid "blooming" or "blinding" effects that can occur due to retroreflective objects. Additionally or alternatively, the hybrid imaging system may operate at a different modulation frequency and/or illuminate the illumination source at a different rate. Other ways to mitigate the effects of retroreflectors are possible and contemplated herein.

In some embodiments, a plurality of frames/scans from the ToF sensor could be utilized to obtain information about the scene, which could be utilized together with other information described in the present disclosure. For example, "optical flow" can be obtained by a pattern of apparent motion of an object between two consecutive ToF frames. The optical flow could include, for example, a two-dimensional vector field that includes the displacement of corresponding objects in the scene between a first ToF frame and a second ToF frame. Based on the optical flow, distances to the objects can be inferred and/or predicted. Such distance information from the optical flow could be utilized to constrain the range of depths estimated using ToF information. That is, the optical flow could provide further information about ranges of objects in a given scene. The rough depth information could be used to determine operating parameters for the ToF sensor and/or the illumination source. Additionally or alternatively, the rough depth information could be used to bound or constrain a set of operating parameters used by the system more generally.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, a physical computer (e.g., a field programmable gate array (FPGA) or application-specific integrated circuit (ASIC)), or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A sensor system comprising:
    at least one time-of-flight (ToF) sensor configured to receive light from a scene;
    at least one light source configured to emit a structured light pattern; and
    a controller that carries out operations, the operations comprising:
        causing the at least one light source, over a first illumination period, to illuminate at least a portion of the scene with the structured light pattern;
        identifying, based on information from the first illumination period, one or more retroreflective regions in the scene;
        adjusting the structured light pattern based on the one or more identified retroreflective regions;
        causing the at least one light source, over a second illumination period, to illuminate the portion of the scene with the adjusted structured light pattern; and
        causing the at least one ToF sensor to provide time of flight information indicative of a depth map of the scene based on the adjusted structured light pattern.

2. The sensor system of claim 1, wherein the adjusted structured light pattern contains lower illumination levels for portions of the scene where the one or more retroreflector regions are present.

3. The sensor system of claim 1, wherein the first illumination period is less than 10 microseconds.

4. The sensor system of claim 1, wherein the first illumination period is shorter than the second illumination period.

5. The sensor system of claim 1, wherein the structured light pattern comprises at least one of: a predetermined light pulse repetition rate, a predetermined light pulse duration, a predetermined light pulse intensity, or a predetermined light pulse duty cycle.

6. The sensor system of claim 1, wherein the at least one light source comprises at least one of: a laser diode, a light-emitting diode, a plasma light source, a strobe light, a solid-state laser, or a fiber laser.

7. The sensor system of claim 1, wherein adjusting the structured light pattern comprises selecting a desired structured light pattern from among a plurality of possible structured light patterns, wherein causing the at least one light source to illuminate at least a portion of the scene with the adjusted structured light pattern comprises illuminating the portion of the scene according to the desired structured light pattern.

8. The sensor system of claim 1, further comprising an imaging sensor, wherein the imaging sensor comprises a plurality of photosensitive elements, wherein the plurality of photosensitive elements comprises at least one million photosensitive elements, wherein the operations further comprise causing the imaging sensor to provide information indicative of an image of the scene based on the adjusted structured light pattern.

9. The sensor system of claim 8, wherein the operations further comprise determining a high-resolution depth map of the scene based on the depth map of the scene and the image of the scene.

10. The sensor system of claim 8, wherein the at least one ToF sensor, the imaging sensor, and the at least one light source are coupled to a common substrate.

11. The sensor system of claim 1, wherein the operations further comprise determining at least one inference about the scene based on the depth map of the scene.

12. The sensor system of claim 11, wherein the at least one inference comprises information about objects in an environment of a vehicle or an operating context of the vehicle.

13. The sensor system of claim 11, wherein the controller comprises at least one deep neural network, wherein the determining the at least one inference is performed by the at least one deep neural network.

14. A system comprising:
    a plurality of sensor systems configured to be coupled to a vehicle, wherein each sensor system comprises:
        at least one time-of-flight (ToF) sensor;
        at least one imaging sensor, wherein the at least one ToF sensor and the at least one imaging sensor are configured to receive light from a scene;
        at least one light source configured to emit a structured light pattern; and
        a controller that carries out operations, the operations comprising:
            causing the at least one light source, over a first illumination period, to illuminate at least a portion of the scene with the structured light pattern;
            identifying, based on information from the first illumination period, one or more retroreflective regions in the scene;
            adjusting the structured light pattern based on the one or more identified retroreflective regions;
            causing the at least one light source, over a second illumination period, to illuminate the portion of the scene with the adjusted structured light pattern
            causing the at least one ToF sensor to provide time of flight information indicative of a depth map of the scene based on the adjusted structured light pattern; and
            causing the imaging sensor to provide information indicative of an image of the scene based on the adjusted structured light pattern.

15. The system of claim 14, wherein the operations further comprise determining a high-resolution depth map of the scene based on the depth map of the scene and the image of the scene.

16. The system of claim 14, wherein at least one of the sensor systems comprises at least one ToF sensor and at least one imaging sensor in a common housing.

17. A method comprising:
    causing at least one light source, over a first illumination period, to illuminate a scene with a structured light pattern;
    identifying, based on information from the first illumination period, one or more retroreflective regions in the scene;
    adjusting the structured light pattern based on the one or more identified retroreflective regions;
    causing the at least one light source, over a second illumination period, to illuminate the scene with the adjusted structured light pattern;

receiving, from a time-of-flight (ToF) sensor, time of flight information about the scene based on the adjusted structured light pattern;

determining a depth map of the scene based on the received information; and determining at least one inference about the scene based on the depth map of the scene.

18. The method of claim 17, wherein the at least one inference comprises information about objects in an environment of a vehicle or an operating context of the vehicle.

19. The method of claim 17, wherein adjusting the structured light pattern comprises selecting a desired structured light pattern from among a plurality of possible structured light patterns, wherein causing the at least one light source to illuminate the scene with the adjusted structured light pattern comprises illuminating the scene according to the desired structured light pattern.

20. The method of claim 17, wherein adjusting the structured light pattern further comprises adjusting the structured light pattern based on an amount of ambient light or a time of day.

21. A method comprising:

providing prior information, wherein the prior information comprises three-dimensional information of a scene;

selecting a structured light pattern based on the prior information;

causing at least one light source to illuminate the scene with the selected structured light pattern; and causing the at least one ToF sensor to provide time of flight information indicative of a depth map of the scene based on the selected structured light pattern.

22. The method of claim 21, further comprising:

comparing the prior information to the depth map of the scene; and based on the comparison, determine a localized position of a vehicle.

23. The method of claim 21, further comprising:

comparing the prior information to the depth map of the scene; and based on the comparison, determine a calibration condition of the ToF sensor.

24. The method of claim 21, further comprising:

projecting the prior information into or onto the depth map of the scene; and based on the projection, determine a localized position of a vehicle.

25. The method of claim 21, further comprising:

determining a background portion of the prior information; and subtracting or ignoring at least a portion of the depth map of the scene corresponding to the background portion.

26. The method of claim 21, further comprising:

determining at least one retroreflective object based on the prior information; and while scanning a portion of the scene corresponding to the at least one retroreflective object, adjusting at least one operating parameter of the ToF sensor or the at least one light source.

* * * * *